United States Patent Office 3,166,579
Patented Jan. 19, 1965

3,166,579
S-(10-PHENOXARSINYL)THIOPSEUDOUREA SALTS
Joseph E. Dunbar, Midland, Mich., assignor to The Dow Chemical Company, Midland, Mich., a corporation of Delaware
No Drawing. Filed Dec. 7, 1962, Ser. No. 242,921
10 Claims. (Cl. 260—440)

The present invention relates to hydrogen halide and picric salts of certain S-(10-phenoxarsinyl)thiopseudoureas. These salts correspond to the formula:

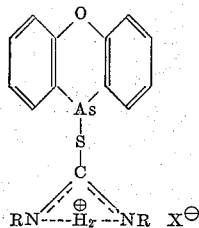

In this and succeeding formulae, X is halide or picrate and the R's taken separately each represent hydrogen, lower alkenyl, alkyl containing up to 18 carbon atoms, phenyl, benzyl, halophenyl or naphthyl and the R's taken together represent ethylene. The expression "lower alkenyl" is employed in the present specification and claims to refer to the alkenyl radicals containing not in excess of five carbon atoms such as allyl, 2-propenyl and 3-butenyl. These compounds are somewhat soluble in many common organic solvents and of low solubility in water. The compounds are useful as parasiticides for the control of a number of parasite species such as worms, ascarids, *Rhizoctonia solani*, tapeworms, *Salmonella typhosa*, mites, flies, beetles and aphids. The compounds are also useful for the modification and inhibition of the growth of plants and plant parts. Thus, they are adapted to be applied to plants, plant parts and their habitats for the modification and inhibition of the growth of aquatic, terrestrial, bacterial and fungal plants. Representative habitats include cutting oils, inks, glues, papers, textiles, oil and latex paints, woods, plastics and high energy fuels.

The picrate salt compounds of the present invention are prepared by mixing and contacting a 10-halophenoxarsine with thiourea or a substituted thiourea corresponding to the formula

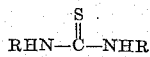

to produce an intermediate salt product. The reaction mixture is thereafter contacted and mixed with picric acid to obtain the desired picric acid salt of the S-(10-phenoxarsinyl)thiopseudourea. The contacting and mixing of the halophenoxarsine, thiourea and picric acid conveniently is carried out in a liquid reaction medium comprising an organic solvent such as an alcohol. The production of the desired salt products takes place smoothly at temperatures of from 50° to 160° C. The amounts of the reagent to be employed are not critical, some of the desired product being obtained when employing any proportion of ingredients. In a preferred operation, substantially equimolecular proportions of the 10-halophenoxarsine and thiourea are employed with about 1.2 molecular proportions of picric acid. In a convenient method of operation, the mixture comprising the 10-halophenoxarsine and thiourea reagents is heated at the boiling temperature and under reflux for a short period of time prior to the treating and mixing of such solution with the picric acid reagent. In carrying out the reaction, the 10-halophenoxarsine, such as the chloro- or bromophenoxarsines, are mixed with the thiourea reagent and the resulting mixture maintained for a period of time at a temperature of from 50° to 160° C. This mixture is thereafter contacted with the picric acid and conveniently with a solution of the picric acid in the solvent employed as reaction medium. The resulting mixture is thereafter set aside for a period of time during which period the desired salt product precipitates in the mixture as a crystalline solid. If desired, a quantity of reaction medium can be removed by evaporation or distillation to facilitate the precipitation of additional desired product. The product is thereafter separated and purified by conventional procedures such as decantation, filtration and recrystallization from various organic solvents.

The S-(10-phenoxarsinyl)thiopseudourea hydrohalides are prepared by contacting a 10-halophenoxarsine such as 10-chlorophenoxarsine or 10-bromophenoxarsine with thiourea and conveniently in an organic solvent as reaction medium. Good results are obtained when employing substantially equimolecular proportions of the halophenoxarsine and thiourea reagents. The contacting and mixing is carried out at temperatures of from 50° to 160° C. and the resulting mixture maintained in this temperature range for a short period of time to insure completion of the reaction. Upon completion of the reaction, the reaction mixture is set aside to cool. During the cooling, the desired hydrogen halide salt precipitates in the mixture as a crystalline solid and is separated and purified as previously described.

The following examples merely illustrate the invention and are not to be construed as limiting.

*Example 1.*—S-(10-phenoxarsinyl)thiopseudourea hydrochloride 10-chlorophenoxarsine (27.8 grams; 0.100 mole) and 7.61 grams (0.100 mole) of thiourea are dispersed in 500 milliliters of ethanol and the resulting mixture heated at the boiling temperature and under reflux. The heating is carried out with stirring and over a period of 35 minutes to insure completion of the reaction. The reaction mixture is thereafter cooled to room temperature. During the cooling, the S-(10-phenoxarsinyl)thiopseudourea hydrochloride product precipitates and is separated by filtration. Further amounts of product are obtained by concentration of the filtrate. The combined product is recrystallized from ethanol and found to melt at 164°–164.5° C. and to have carbon, hydrogen and nitrogen contents of 44.18 percent, 3.36 percent and 7.75 percent, respectively, as compared to theoretical contents of 44.02 percent, 3.41 percent and 7.90 percent.

*Example 2.*—S-(10-phenoxarsinyl)thiopseudourea picrate 10-chlorophenoxarsine (27.8 grams; 0.100 mole) and 7.61 grams (0.100 mole) of thiourea are dispersed in 325 milliliters of ethanol and the resulting mixture heated at the boiling temperature and under reflux. The heating is carried out with stirring and over a period of 1.3 hours. Following the heating period, the reaction mixture is added rapidly with stirring to 340 milliliters of ethanolic picric acid solution (saturated at room temperature). Stirring is thereafter continued and the resulting mixture allowed to come to room temperature. During this period, the S-(10-phenoxarsinyl)thiopseudourea picrate product precipitated as a yellow, crystalline solid and was separated by filtration and recrystallized from ethanol. The recrystallized product melted at 195.5°–196.5° C. with decomposition and had carbon, hydrogen and arsenic contents of 41.65 percent, 2.65 percent and 13.72 percent, respectively, as compared to the theoretical contents of 41.69 percent, 2.58 percent and 13.69 percent.

Example 3.—S-(10-phenoxarsinyl)-N-phenylthiopseudo- urea picrate 10-chlorophenoxarsine (21.5 grams; 0.0775 mole) and 11.8 grams (0.0775 mole) of N-phenylthiourea is dispersed in 350 milliliters of ethanol and the resulting mixture heated at the boiling temperature and under reflux. The heating is carried out with stirring and over a period of 1.25 hours. The warm reaction mixture is then poured with stirring into 260 milliliters of hot ethanol containing about 0.1 mole of picric acid. Upon cooling, the S-(10-phenoxarsinyl)-N-phenylthiopseudourea picrate product precipitates in the reaction mixture as a yellow, crystalline solid and is thereafter separated by filtration. This product melted at 168°–172° C. with decomposition and had carbon, hydrogen and arsenic contents of 48.32 percent, 3.26 percent and 12.12 percent, respectively, as compared to the theoretical contents of 48.16 percent, 2.91 percent and 12.02 percent.

Example 4.—S-(10-phenoxarsinyl)-N-allylthiopseudourea hydrochloride 10-chlorophenoxarsine (27.8 grams; 0.100 mole) and 11.6 grams (0.100 mole) of N-allylthiourea are dispersed in 500 milliliters of ethanol and the resulting mixture heated with stirring at the boiling temperature and under reflux for a period of 15 hours. The reaction mixture is thereafter cooled to room temperature. During the cooling, the S-(10-phenoxarsinyl)-N-allylthiopseudourea hydrochloride product precipitates in the mixture as a white, crystalline solid and is separated by filtration. This product is recrystallized from a mixture of nitromethane and dimethylformamide and found to melt at 187.5°–188.5° C. and to have carbon, hydrogen and sulfur contents of 48.61 percent, 4.12 percent and 8.24 percent, respectively, as compared to the theoretical contents of 48.68 percent, 4.09 percent and 8.12 percent.

Example 5.—S-(10-phenoxarsinyl)-N,N'-bis(p-chlorophenyl)thiopseudourea picrate 10-chlorophenoxarsine (27.8 grams; 0.100 mole) and 28.3 grams (0.100 mole) of N,N'-bis(p-chlorophenyl) thiourea are dispersed in 325 milliliters of ethanol and the resulting mixture heating at the boiling temperature and under reflux with stirring for 1.3 hours. The reaction mixture is thereafter poured into 340 milliliters of ethanol containing about 0.12 mole of picric acid. Upon cooling, the S-(10-phenoxarsinyl)-N,N'-bis(p-chlorophenyl) thiopseudourea picrate product precipitated as a yellow, crystalline solid and was separated by filtration. This product melted at 149°–150.5° C. with decomposition and had carbon, hydrogen and arsensic contents of 48.59 percent, 2.63 percent and 9.88 percent, respectively, as compared to the theoretical contents of 48.45 percent, 2.62 percent and 9.75 percent.

Example 6.—S-(10-phenoxarsinyl)-N,N'-ethylenethiopseudourea picrate 10-chlorophenoxarsine (22.3 grams; 0.0800 mole) and 8.17 grams (0.0800 mole) of N,N'-ethylenethiourea are dispersed in 325 milliliters of ethanol and the resulting mixture heated at the boiling temperature and under reflux. The heating is carried out with stirring and over a period of two hours. Following the heating period, the brown mixture is treated with decolorizing charcoal and filtered hot into 320 milliliters of warm ethanol containing about 1.2 moles of picric acid. Stirring is thereafter continued and the resulting diluted mixture allowed to come to room temperature. During the cooling, an S-(10-phenoxarsinyl)-N,N'-ethylenethiopseudourea picrate product crystallizes as a yellow crystalline solid and is separated by filtration. Further product is obtained by concentration of the filtrate. The two batches of product are combined and, after recrystallization from ethanol, the product melts at 136°–140.5° C. with decomposition and has carbon, hydrogen and arsensic contents of 44.04 percent, 2.93 percent and 13.15 percent, respectively, as compared to the theoretical contents of 43.99 percent, 2.81 percent and 13.06 percent.

Example 7.—S-(10-phenoxarsinyl)-N,N'-dibenzylthiopseudourea picrate 10-chlorophenoxarsine (22.3 grams; 0.0800 mole) and 20.5 grams (0.0800 mole) of N,N'-dibenzylthiourea are dispersed in 325 milliliters of ethanol and the resulting mixture heated at the boiling temperature and under reflux. The heating is carried out with stirring and over a period of 1.5 hours. The hot solution is then treated with decolorizing charcoal and filtered into 320 milliliters of warm ethanol containing about 0.12 mole of picric acid. Upon cooling, the S-(10-phenoxarsinyl)-N,N'-dibenzylthiopseudourea picrate product crystallizes as a yellow crystalline solid and is separated by filtration. After recrystallization from ethanol, the product melts at 156°–158.5° C. with decomposition and has carbon, hydrogen and arsenic contents of 54.57 percent, 3.74 percent and 10.35 percent, respectively, as compared to the theoretical contents of 54.47 percent, 3.60 percent and 10.30 percent.

Example 8.—S-(10-phenoxarsinyl)-N,N'-diethylthiopseudourea picrate 10-chlorophenoxarsine (27.8 grams; 0.100 mole) and 13.2 grams (0.100 mole) of N,N'-diethylthiourea are dispersed in 325 milliliters of ethanol and the resulting mixture heated at the boiling temperature and under reflux. The heating is carried out with stirring over a period of 1.5 hours. The hot solution is then treated with decolorizing charcoal and filtered into 340 milliliters of warm ethanol containing about 0.12 mole of picric acid. Upon cooling the solution, a yellow crystalline solid is obtained and collected on a filter. Recrystallization of this product from ethanol gave the S-(10-phenoxarsinyl)-N,N'-diethylthiopseudourea picrate which melts at 151°–153° C. with decomposition and has carbon, hydrogen and arsenic contents of 46.06 percent, 3.96 percent and 12.43 percent, respectively, as compared with the theoretical contents of 45.78 percent, 3.68 percent and 12.41 percent.

In exactly comparable operations, other products of the present invention are prepared as follows:

S-(10-phenoxarsinyl)-N-methylthiopseudourea picrate (melting at 181.5°–182° C. with decomposition; carbon, hydrogen and arsenic contents of 42.89 percent, 2.87 percent and 13.61 percent, respectively, as compared to the theoretical contents of 42.79 percent, 2.87 percent and 13.34 percent) by reacting together 10-chlorophenoxarsine, N-methylthiourea and picric acid.

S-(10-phenoxarsinyl) - N - allylthiopseudourea picrate (melting at 201.5°–202.5° C. with decomposition; carbon, hydrogen and arsenic contents of 45.03 percent, 3.01 percent and 12.79 percent, respectively, as compared with the theoretical contents of 44.98 percent, 3.09 percent and 12.75 percent) by reacting together 10-chlorophenoxarsine, N-allylthiourea and picric acid.

S-(10-phenoxarsinyl) - N - butylthiopseudourea picrate (melting at 173°–174° C.; carbon, hydrogen and arsenic contents of 45.80 percent, 3.75 percent and 12.59 percent, respectively, as compared to the theoretical contents of 45.78 percent, 3.68 percent and 12.41 percent) by reacting together 10-chlorophenoxarsine, N-butylthiourea and picric acid.

S - (10-phenoxarsinyl)-N-heptylthiopseudourea picrate (melting at 140°–142° C.; carbon, hydrogen and arsenic contents of 48.66 percent, 4.62 percent and 11.82 percent, respectively, as compared to the theoretical contents of 48.38 percent, 4.37 percent and 11.61 percent) by reacting together 10-chlorophenoxarsine, N-heptylthiourea and picric acid.

S-(10-phenoxarsinyl) - N,N' - dimethylthiopseudourea picrate (molecular weight of 563) by reacting together 10-chlorophenoxarsine, N',N-dimethylthiourea and picric acid.

S-(10-phenoxarsinyl)-N-dodecylthiopseudourea picrate (melting at 105.5°–106.5° C.; carbon, hydrogen and arsenic contents of 52.00 percent, 5.23 percent and 10.55 percent, respectively, as compared to the theoretical contents of 52.03 percent, 5.35 percent and 10.47 percent) by reacting together 10-chlorophenoxarsine, N-dodecylthiourea and picric acid.

S-(10 - phenoxarsinyl)-N,N'-dibutylthiopseudourea picrate (molecular weight of 659) by reacting together 10-chlorophenoxarsine, N,N'-dibutylthiourea and picric acid.

S-(10 - phenoxarsinyl)-N-octadecylthiopseudourea picrate (melting at 103°–104° C.; carbon, hydrogen and arsenic contents of 55.71 percent, 6.22 percent and 9.27 percent, respectively, as compared to the theoretical contents of 55.56 percent, 6.30 percent and 9.37 percent) by reacting together 10-chlorophenoxarsine, N-octadecylthiourea and picric acid.

S-(10-phenoxarsinyl)-N - (1-naphthyl)thiopseudourea picrate (melting at 171°–173.5° C.; carbon, hydrogen and arsenic contents of 51.75 percent, 3.02 percent and 10.97 percent, respectively, as compared to the theoretical contents of 51.72 percent, 2.99 percent and 11.12 percent) by reacting together 10-chlorophenoxarsine, N-(1-naphthyl)thiourea and picric acid.

S-(10 - phenoxarsinyl)-N-(2,4,5-trichlorophenyl)-thiopseudourea picrate (molecular weight of 726.5) by reacting together 10-chlorophenoxarsine, N-(2,4,5-trichlorophenyl)thiourea and picric acid.

S - (10 - phenoxarsinyl)thiopseudourea hydrobromide (melting at 160°–162° C.; carbon, hydrogen and sulfur contents of 39.19 percent, 2.97 percent and 8.10 percent, respectively, as compared to the theoretical contents of 39.12 percent, 3.03 percent and 8.03 percent) by reacting together 10-bromophenoxarsine and thiourea.

The compounds of the present invention are useful as pesticides for the control of a number of insect and plant species. For such uses, the products can be dispersed on an inert finely divided solid and employed as dusts. Such mixtures also can be dispersed in water with or without the aid of surface active dispersing agents and employed as sprays. In other procedures, the products can be employed as active toxic constituents in inks, glues, fuels, oils, polymeric materials, paper, textiles, wood, aqueous emulsions or dispersions and cooling tower and well flooding waters. In representative operations, aqueous compositions containing 500 parts per million by weight of S-(10 - phenoxarsinyl)thiopseudourea hydrochloride give substantially complete controls of trash fish, Southern army worms, money wort, pig weed and soil-dwelling organisms of root rot and decay. In other operations, aqueous compositions containing 500 parts per million by weight of S-(10-phenoxarsinyl)thiopseudourea picrate give substantially complete controls of cockroaches, Daphnia, snails, algae and Cabomba.

What is claimed is:

1. The picric acid salts of the S-(10-phenoxarsinyl) thiopseudoureas having the formula

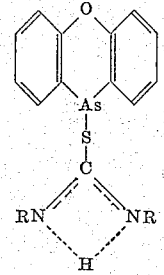

wherein the R's taken together represent ethylene, and the R's taken separately each represent a member of the group consisting of hydrogen, lower alkenyl, alkyl containing up to 18 carbon atoms, phenyl, benzyl, halophenyl and naphthyl.

2. The hydrogen halide salts of S-(10-phenoxarsinyl) thiopseudourea.

3. S-(10-phenoxarsinyl)thiopseudourea hydrochloride.

4. S-(10-phenoxarsinyl)thiopseudourea picrate.

5. S-(10-phenoxarsinyl) - N,N'-diethylthiopseudourea picrate.

6. S-(10-phenoxarsinyl)thiopseudourea picrate.

7. S-(10-phenoxarsinyl)-N - heptylthiopseudourea picrate.

8. S-(10-phenoxarsinyl) - N - octadecylthiopseudourea picrate.

9. S-(10-phenoxarsinyl) - N - dodecylthiopseudourea picrate.

10. S-(10-phenoxarsinyl)-N-allylthiopseudourea hydrochloride.

No references cited.